(12) United States Patent
Yamamoto et al.

(10) Patent No.: US 7,333,650 B2
(45) Date of Patent: Feb. 19, 2008

(54) DEFECT INSPECTION APPARATUS (75) Inventors: Takayasu Yamamoto, Aichi (JP); Eiji Yonezawa, Aichi (JP); Taizo Umezaki, Aichi (JP)

(73) Assignee: Nidek Co., Ltd., Aichi (JP)

( * ) Notice: Subject to any disclaimer, the term of this patent is extended or adjusted under 35 U.S.C. 154(b) by 685 days.

(21) Appl. No.: 10/855,320

(22) Filed: May 28, 2004

(65) Prior Publication Data
US 2005/0002560 A1 Jan. 6, 2005

(30) Foreign Application Priority Data
May 29, 2003 (JP) .......................... P2003-153313
May 29, 2003 (JP) .......................... P2003-153384

(51) Int. Cl.
*G06K 9/00* (2006.01)
(52) U.S. Cl. .................. 382/145; 382/156; 382/159
(58) Field of Classification Search ........ 382/141–149, 382/156, 159, 224; 348/92, 125
See application file for complete search history.

(56) References Cited

U.S. PATENT DOCUMENTS

| | | | |
|---|---|---|---|
| 6,282,309 B1 * | 8/2001 | Emery | 382/145 |
| 6,968,079 B2 * | 11/2005 | Yoshikawa et al. | 382/145 |
| 7,113,628 B1 * | 9/2006 | Obara et al. | 382/149 |
| 7,215,811 B2 * | 5/2007 | Moselhi et al. | 382/156 |
| 2006/0274933 A1 * | 12/2006 | Obara et al. | 382/149 |

* cited by examiner

*Primary Examiner*—Daniel Mariam
(74) *Attorney, Agent, or Firm*—Sughrue Mion, PLLC (57) ABSTRACT A defect inspection apparatus for inspecting an object to be inspected for a defect by processing an image taken from the object, includes: neural networks provided respectively for individual defect types to be classified; a learning unit which makes the neural networks learn based on the corresponding defect types to be classified; and a defect detection unit which classifies and detects defect types using the neural networks that have learned.

4 Claims, 7 Drawing Sheets

| ITEM | SHOT DEFOCUS | PARTIAL DEFOCUS | FLAW | POST-DEVELOPMENT DEFECT | REMARK |
|---|---|---|---|---|---|
| DEFECT BRIGHTNESS | O | | | | |
| ADJUSTING VALUE FOR DEFECT BRIGHTNESS | | | | | |
| DEFECT POSITION (X-DIRECTION) | O | O | O | | |
| DEFECT POSITION (Y-DIRECTION) | O | O | O | | |
| MODEL OF DEFECT | | O | O | | |
| DEFECT BLUR DISTRIBUTION | | O | | | |
| DEFECT SIZE | | O | | O | |
| DEFECT LENGTH | | | O | O | |
| DEFECT THICKNESS | | | O | | |
| DEFECT ANGLE | | | O | | |
| NUMBER OF DEFECT VERTEXES | | | O | | |
| DEFECT VERTEX SPACING | | | O | | |
| DEFECT VERTEX POTION (X-DIRECTION) | | | O | | |
| DEFECT VERTEX POTION (Y-DIRECTION) | | | O | | |
| RADIUS OF CURVATURE OF DEFECT | | | O | | |
| SHOT SIZE (X-DIRECTION) | O | O | O | O | |
| SHOT SIZE (Y-DIRECTION) | O | O | O | O | |
| NUMBER OF CHIPS WITHIN SHOT (X-DIRECTION) | O | O | O | O | |
| NUMBER OF CHIPS WITHIN SHOT (Y-DIRECTION) | O | O | O | O | |
| CHIPS SPACING (X-DIRECTION) | O | O | O | O | |
| CHIPS SPACING (Y-DIRECTION) | O | O | O | O | |
| NUMBER OF PATTERNS WITHIN CHIP (X-DIRECTION) | O | O | O | O | ONLY MEMORY PATTERN |
| NUMBER OF PATTERNS WITHIN CHIP (Y-DIRECTION) | O | O | O | O | ONLY MEMORY PATTERN |
| BRIGHTNESS NONUNIFORMITY SIZE | O | O | O | O | ONLY LOGIC PATTERN |
| BRIGHTNESS NONUNIFORMITY SHAPE | O | O | | | ONLY LOGIC PATTERN |
| BRIGHTNESS NONUNIFORMITY CENTER POSITION (X-DIRECTION) | O | O | | | X-, Y-DIRECTIONS Z-DIRECTION |
| BRIGHTNESS NONUNIFORMITY CENTER POSITION (Y-DIRECTION) | O | O | | | |

FIG. 8

DEFECT INSPECTION APPARATUS

BACKGROUND OF THE INVENTION

The present invention relates to a defect inspection apparatus for inspecting an object for a defect.

In macro inspection for inspecting a surface of an object such as a patterned wafer for a defect in a semiconductor fabrication plant, intense light is shot at the object surface from obliquely. The operator observes the state of scattered light or diffracted light by visual inspection to judge whether there is a defect or not, its type and the like. However, individual operators vary in inspection ability. Further, operators may miss detecting a defect. Therefore, it is difficult to secure stable quality. Furthermore, the operator comes close to the object, contaminating the object. This creates a great obstacle in improving the product yield. Accordingly, a defect inspection apparatus for automatically inspecting an object for a defect by taking an image of its surface and processing the image has been proposed.

However, defect inspection relying on image processing of related art is intended to inspect for a defect by a logical decision in which various filters and threshold processing are combined. Various defect types are produced at each fabrication step of the object. It is difficult to classify and detect the defect types if only the combinations of various filters and standardized threshold processing are used.

SUMMARY OF THE INVENTION

The technical problem addressed by the present invention is to provide a defect inspection apparatus capable of making inspections by classifying defect types efficiently and accurately (i.e., classifying a defect according to type).

To solve the above-described problem, the present invention has the following configuration.

(1) A defect inspection apparatus for inspecting an object to be inspected for a defect by processing an image taken from the object, the defect inspection apparatus comprising:

neural networks provided respectively for individual defect types to be classified;

a learning unit which makes the neural networks learn based on the corresponding defect types to be classified; and a defect detection unit which classifies and detects defect types using the neural networks that have learned.

(2) A defect inspection apparatus according to (1), wherein the neural networks include at least two of a neural network for a flaw produced during fabrication of the object, a neural network for a partial defocus produced during exposure of the object, a neural network for a shot defocus produced during exposure of the object, and a neural network for a post-development defect produced during development of the object.

(3) A defect inspection apparatus according to (1), wherein the neural networks include a neural network for a shot defocus produced during exposure of the object, and the apparatus further includes an image size conversion unit which converts size of the taken image by an affine transformation so as to correspond to size of an input layer before the taken image is entered into the neural network for a shot defocus.

(4) A defect inspection apparatus according to (1), further comprising an interpolation unit which, where the taken image contains outside of an objective region of the object, interpolates data about the outside of the objective region based on data about brightness of the objective region before the taken image is entered into the neural networks.

(5) A defect inspection apparatus according to (1) further comprising an artificial defect image creation unit which creates an artificial defect image for each defect type to be classified by image processing, wherein the learning unit makes the neural networks learn by the artificial defect image for the corresponding defect type.

(6) A defect inspection apparatus according to (5), wherein the artificial defect image creation unit creates the artificial defect image by determining at least one of a position, brightness, and a shape of the defect using random numbers.

(7) A defect inspection apparatus according to (5), wherein the learning unit makes the neural networks to learn by determining a learning pattern of the artificial defect images and good product images for the corresponding defect type using random numbers.

(8) A defect inspection apparatus for inspecting an object to be inspected for a defect by processing an image taken from the object, the defect inspection apparatus comprising:

a neural network;

an artificial defect image creation unit which creates an artificial defect image by image processing;

a learning unit which makes the neural network learn by the created artificial defect image; and a defect detection unit which detects the defect using the neural network that have learned.

(9) A defect inspection apparatus according to (8), wherein the artificial defect image creation unit creates the artificial defect image by determining at least one of a position, brightness, and a shape of the detect using random numbers.

DETAILED DESCRIPTION OF PREFERRED EMBODIMENTS

Figure 1:
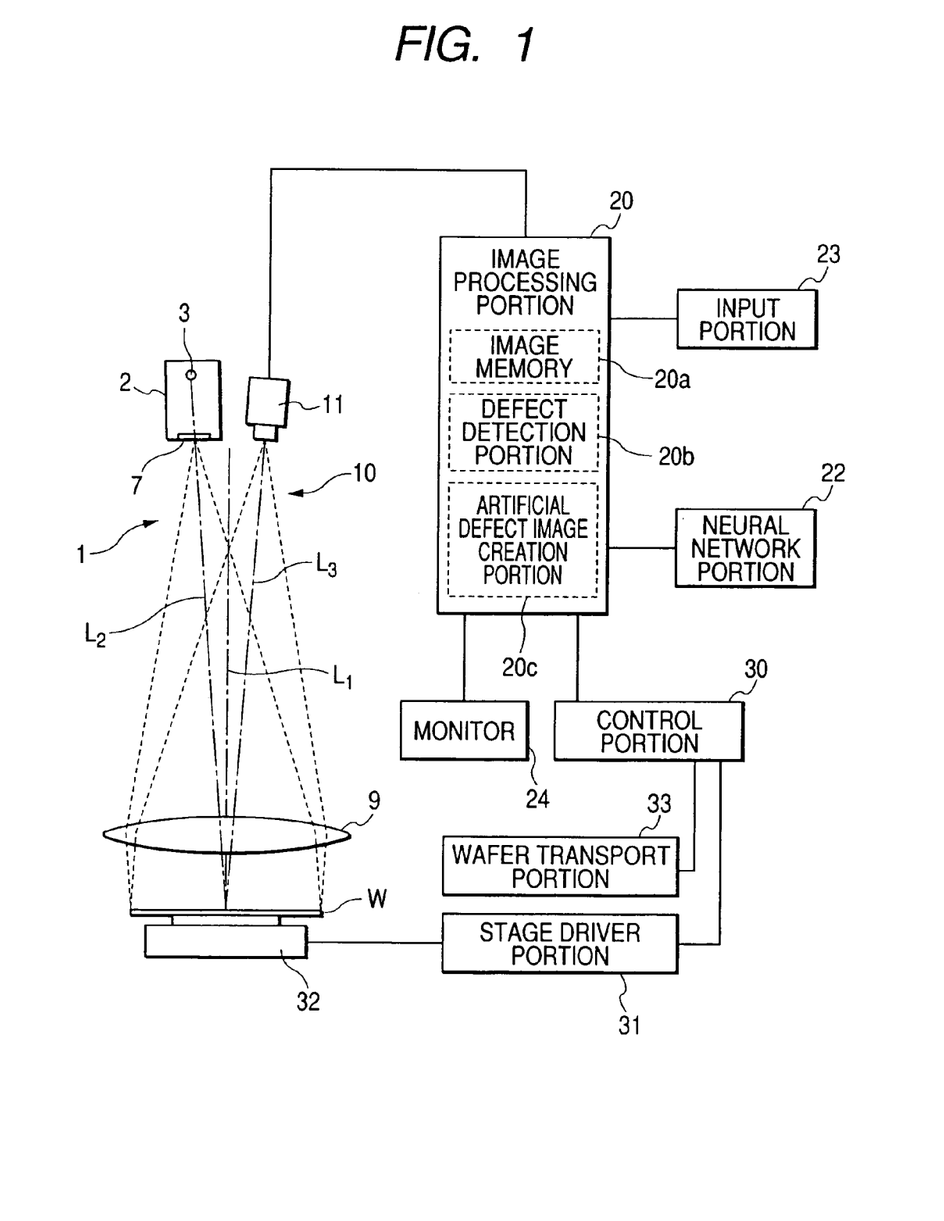
FIG. 1 is a schematic diagram of a defect inspection apparatus according to the present invention.

One embodiment of the present invention is hereinafter described with reference to the drawings. FIG. 1 is a schematic diagram of a defect inspection apparatus according to the present invention.

A stage 32 is moved in the X- and Y-directions (in directions parallel to the stage surface) by a stage moving portion 31. A wafer W that is an object to be inspected is automatically transported onto the stage 32 by a wafer transport portion 33 and placed on the stage 32 such that the inspected surface is placed on the top. A control portion 30 controls the whole of the inspection apparatus.

An illumination optical system 1 illuminates the surface (inspected surface) of the wafer W placed on the stage 32. The illumination optical system 1 includes an illumination unit 2 having a light source and a collimator lens 9 having a diameter larger than that of the wafer W. An imaging optical system 10 takes an image of the surface of the wafer W illuminated by the illumination optical system 1. The imaging optical system 10 includes the collimator lens 9 and a CCD camera 11 (alternatively CMOS camera can be employed), the lens 9 being shared between the illumination optical system 1 and the imaging optical system 10.

The optical axis $L_3$ of the imaging optical system 10 and the optical axis $L_2$ of the illumination optical system 1 are arranged symmetrically with respect to the optical axis $L_1$ of the lens 9. The camera 11 takes an image of the wafer W using light regularly reflected from the wafer W illuminated by the illumination optical system 1. The camera 11 is so positioned that it takes an image of the wafer W from an almost vertical direction while avoiding interference with the illumination unit 2. In the present embodiment, the angle made between the optical axes $L_1$ and $L_2$ and the angle made between the optical axes $L_1$ and $L_3$ are set to 3 degrees. Since the tilt of the optical axis $L_3$ with respect to the surface of the wafer W is not so large, the effects of distortion and defocus of the image are small.

Alternatively, the optical axes $L_1$ and $L_2$ may be made coincident, and the wafer W maybe illustrated from the vertical direction. The optical axis $L_3$ may also be made coaxial using a half mirror. In this way, an image of the wafer W may be taken using regularly reflected light while avoiding interference between the illumination unit 2 and the camera 11.

The illumination unit 2 includes a halogen lamp 3 as a light source and a diffusing plate 7. Light emitted from the lamp 3 is diffused by the diffusing plate 7 to produce diffused illuminating light having sufficiently uniform brightness. The diffused illuminating light is substantially collimated by the lens 9 and then illuminates the wafer W placed on the stage 32. Regularly reflected light from the wafer W is converged by the lens 9. An image of the substantially whole surface of the wafer W is focused onto the camera 11.

Figure 2:
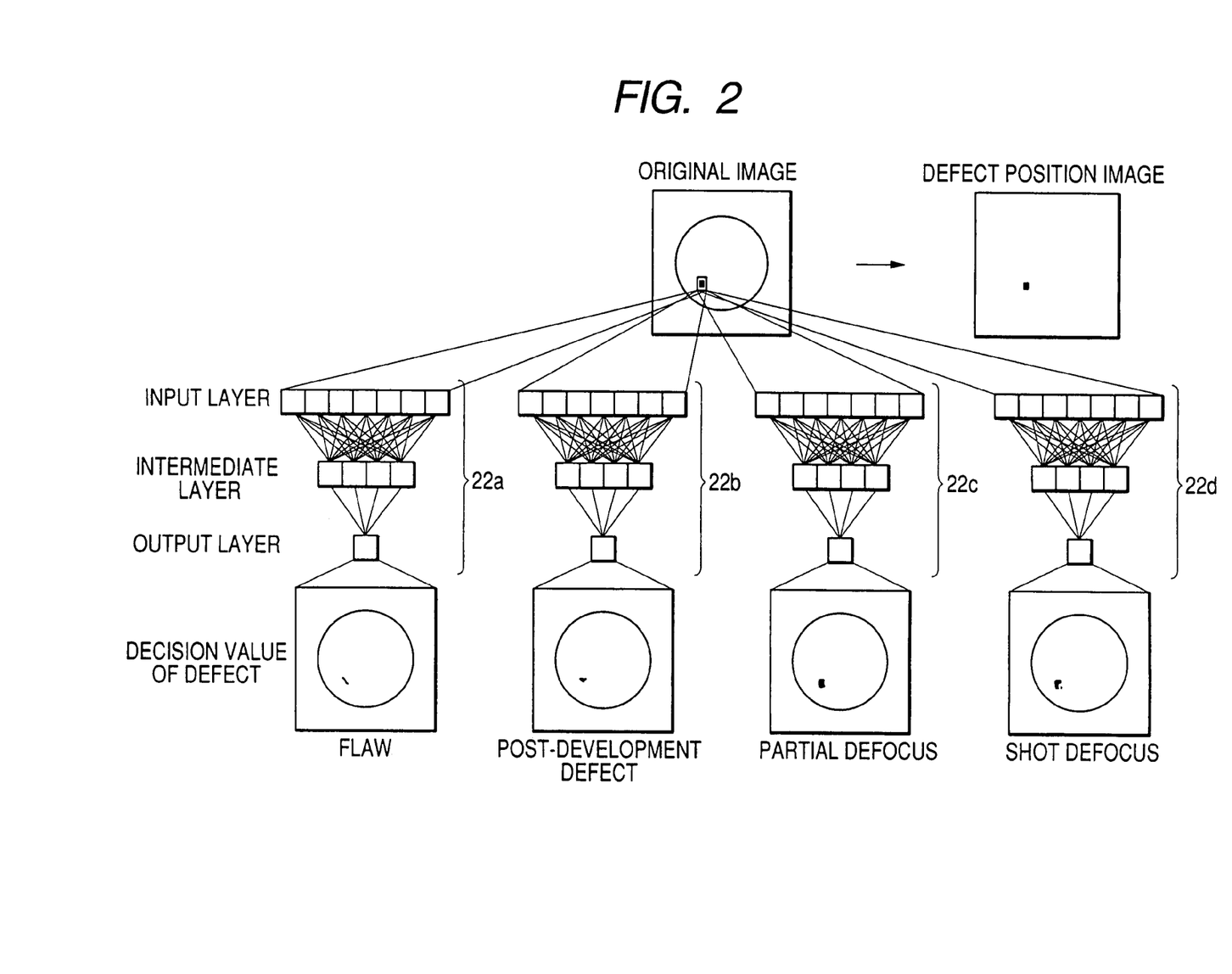
FIG. 2 is a diagram illustrating a neural network portion.
Figure 6:
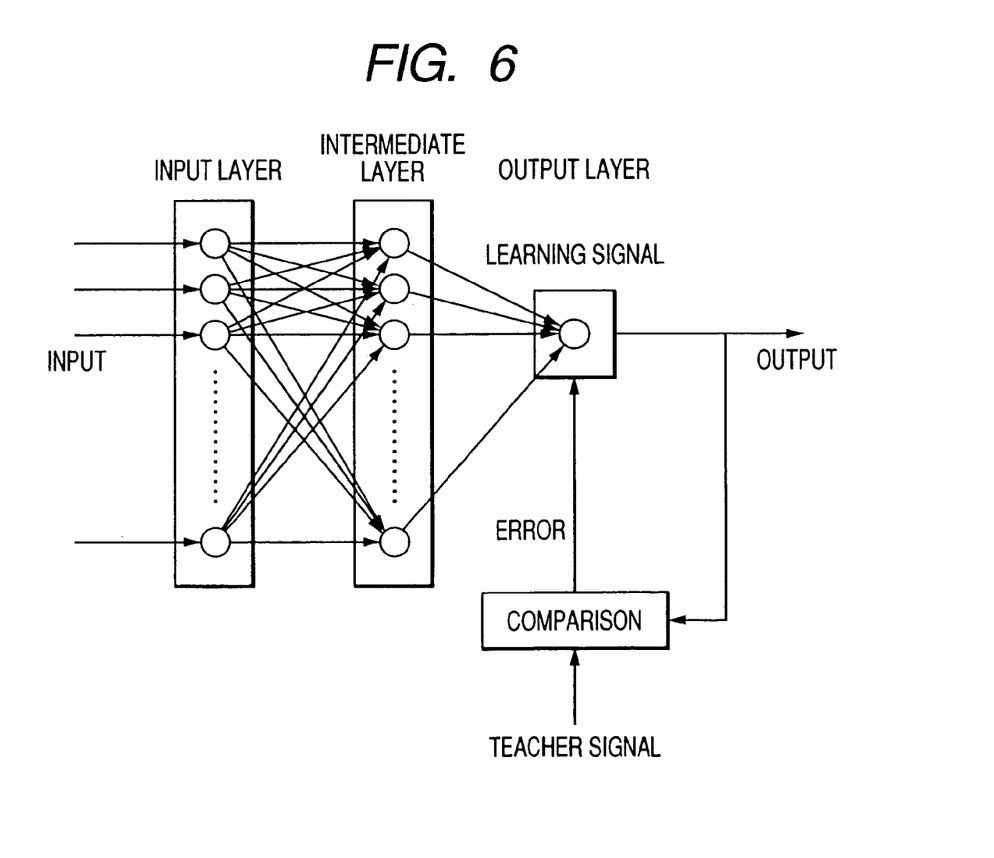
FIG. 6 is a diagram illustrating a neural network portion.

An image signal from the camera 11 is entered into an image processing portion 20. The image processing portion 20 includes an image memory 20a for storing image data, a defect detection portion 20b for detecting a defect, and an artificial defect image creation portion 20c for creating-an artificial defect image by image processing. Examples of the defects include a flaw (its typical shape is linear), a post-development defect (its typical shape is an indefinite shape with a clear boundary), a partial defocus (its typical shape is a circular shape with an unclear (vague)), and a shot defocus (its typical shape is a shot shape with a clear boundary). The image processing portion 20 is connected with a neural network portion 22. As shown in FIG. 2, the neural network portion 22 has a neural network 22a for a flaw, a neural network 22b for a post-development defects, a neural network 22c for a partial defocus, and a neural network 22d for a shot defocus. In this way, neural networks are provided for the respective defect types to be classified. As shown in FIG. 6, each of the neural networks 22a-22d is composed of an input layer, one or more intermediate layers, and an output layer. These neural networks 22a-22d are learned using a generally known error back propagation method. The input portion 23 is a means for entering an instruction signal for the image processing portion 20. The image processing portion 20, the neural network portion 22, and the input portion 23 can be made of a personal computer. A monitor 24 displays the results of the inspection and so on.

A defect inspection using the present system will be described. The neural network portion 22 is, made to learn the defect types intrinsically produced during a semiconductor wafer fabrication sequence such that a result of a decision indicating the presence or absence of each defect type (flaw, partial defocus, shot defocus, or post-development defect) to be classified can be output. The wafer fabrication sequence consists of formation of a thin film, application of a photoresist, exposure, development, etching, and metallization in this order, for example. Of these fabrication steps, a flaw may be produced during transport for successive process steps. Furthermore, a partial defocus and a shot defocus may be produced during exposure step. A post-development defect may be produced during development step. Accordingly, the defect inspection may be performed after the whole fabrication sequence has ended or after the end of each fabrication step.

Learning done by the neural network portion 22 will be described. First, defect samples for learning are prepared for each defect type to be classified, in order to make the neural network portion 22 learn. One of the samples is placed on the stage 32 and illuminated by the illumination unit 2. An image of the sample is taken by the camera 11. Data about the image of the sample taken by the camera 11 is stored in the image memory 20a.

Figure 3:
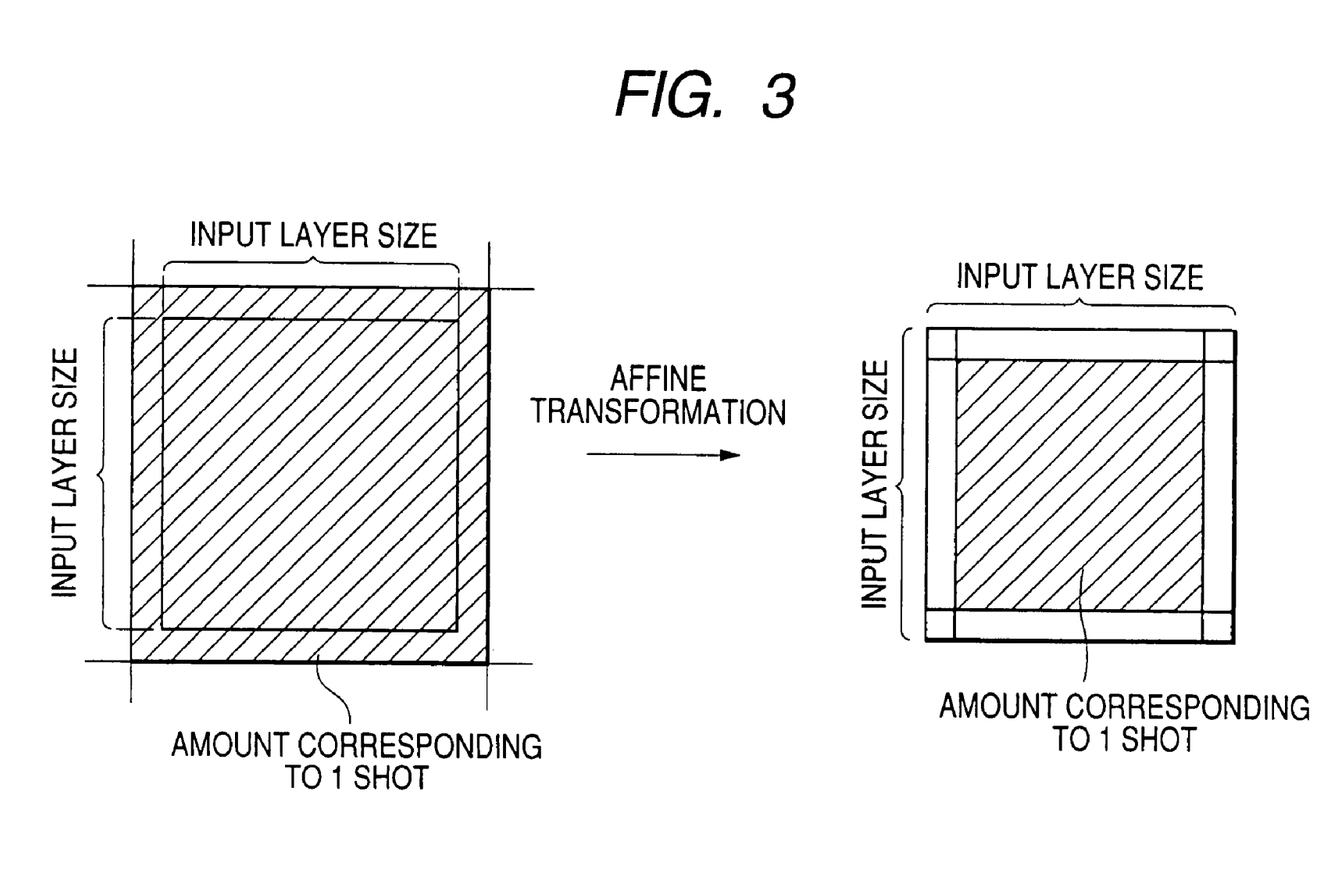
FIG. 3 is a diagram illustrating the manner in which the size of an image is converted by an affine transformation.

Then, as shown in FIG. 2, a defective region portion of the original image obtained by imaging a defect sample is extracted. The image processing portion 20 performs preprocessing or compression (if necessary), and the processed image is used as a learning pattern. The processing described so far is performed according to the feature of the defect and so the processing differs among the neural networks 22a-22d. With respect to a flaw, a post-development defect, and a partial defocus, they have features in a shape and edges. Therefore, the edges are enhanced by a Sobel transformation. Furthermore, a post-development defect and a partial defocus usually involve considerable areas. Consequently, taking account of the learning efficiency and processing time, compression to ½ is performed. A shot defocus has a shot shape, it being noted that the shot is a unit of exposure. Therefore, as shown in FIG. 3, the size of the taken image is converted by an affine transformation such that the result corresponding to one shot is received within the size of the input layer. Boundary coordinates corresponding to one shot have been previously entered from the input portion 23. With respect to an image which can be received in the size of the input layer, information of surrounding shots may be contained, as well as information about one shot. This makes it easy to compare the one shot and surrounding shots in terms of brightness (luminance). A defect due to a partial defocus creates a blurred image and thus it is necessary to emphasize the contrast. For this purpose, a sigmoid function or, the like, is used, and the brightness is converted to facilitate checking the partial defocus.

Figure 4A:
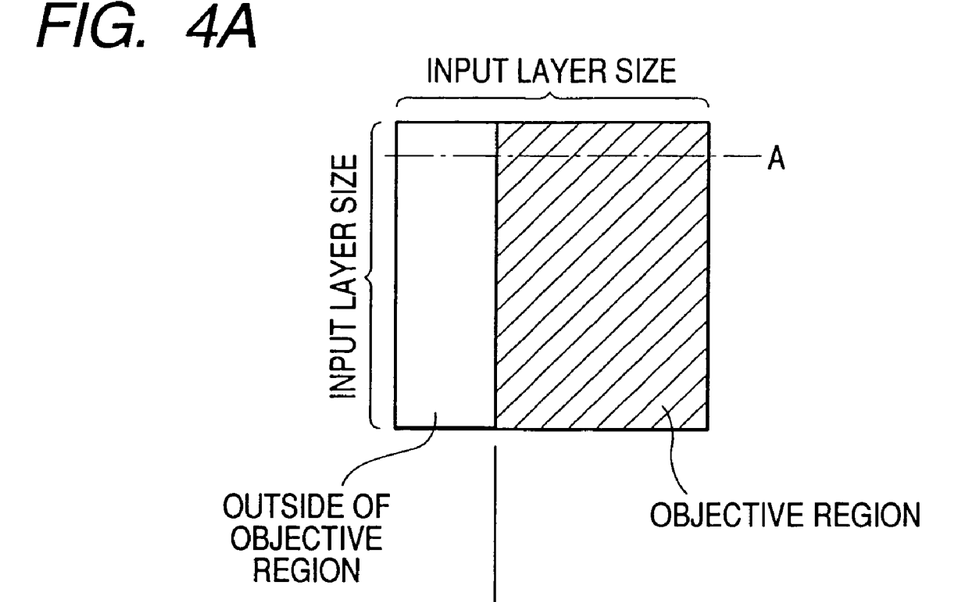
FIGS. 4A and B are diagrams illustrating interpolation of data about outside of an objective region.
Figure 4B:
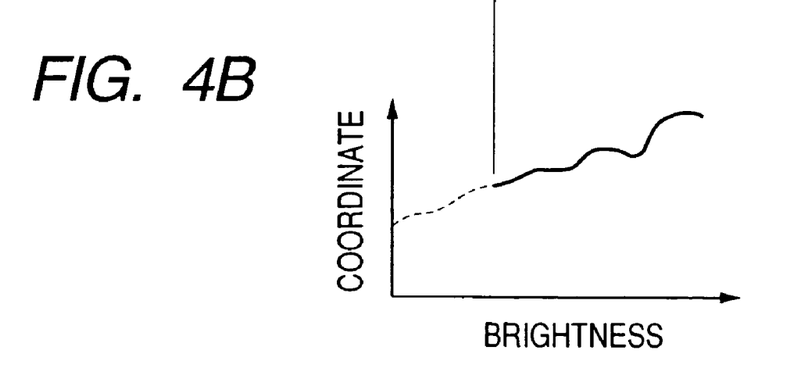

The extraction position of a learning pattern is determined using random numbers to prevent the same pattern from being learned. That is, the extraction position is determined at random using random numbers to prevent the neural networks 22a-22d from memorizing the order of learning data. This prevents the positional information about the defect from being reflected in the learning done by the neural networks 22a-22d. With respect to an excitation pattern when a post-development defect and a partial defocus are learned, the system is so set up that the area of the defect occupies more than 60% of the extracted area. With respect to an excitation pattern when a flaw is learned, the extraction is so performed that a linear defect always exists within the range in the center of the extracted window.

Where the extraction position contains outside of the objective region, if it is entered intact into the neural network portion 22, a rapid brightness change occurs across the boundary between the objective region and the outside of the objective region. Consequently, abnormal results are produced. To prevent abnormal results from being output, it is necessary to interpolate the data about the outside of the objective region before entry into the neural network, portion 22. For this reason, as shown in FIG. 4A, if outside of the objective region is contained in the size of the input layer, brightness data about the outside of the objective region is extrapolated based on the brightness data about the objective region. For example, where the brightness distribution in the objective range in the horizontal line direction A shown in FIG. 4A is as indicated by the solid line in FIG. 4B, the brightness distribution in the outside of the objective range is formed as indicated by the broken line in FIG. 4B, by spline interpolating the information. Instead of the spline interpolation, the brightness distribution in the outside of the objective range may be obtained simply by linearly interpolating the data about the brightness in the objective range.

Suppressed learning effective in improving the capability to judge a defect is introduced in the learning done by the neural network portion 22. The suppressed learning is performed for a defect outside of the object to be learned, as well as for good parts. The teacher signal is set to 1 in the case of an excitation pattern and to 0 in the case of a suppressed pattern.

The teacher signal corresponding to the learning pattern of defect classification as described so far is entered into the neural network portion 22. Whenever a new learning pattern is entered, the neural network portion 22 finds the type of the defect, based on the already learned contents, and outputs the type from the output layer.

Images used for learning and inspection include the original image obtained by imaging and a defect position image that is output in a corresponding manner. The defect position image has information about defect (1) or no defect (0) at each pixel. The position corresponds to the original image in a 1:1 relation.

An artificial defect image is next described. In macro inspection of a wafer, problems intrinsic to the inspection take place. That is, the frequency at which a defect is produced is low. Further, it is difficult to collect defect samples for learning. Furthermore, in a method of making the network learn only using samples already obtained, the possibility that incorrect results are output in response to unlearned data is increased. Accordingly, a lack of learning pattern is compensated for by creating a defect artificially using a program and causing the neural network portion 22 to learn the artificial defect. Furthermore, learning of various patterns can increase the rate at which unlearned data is recognized.

Figure 7:
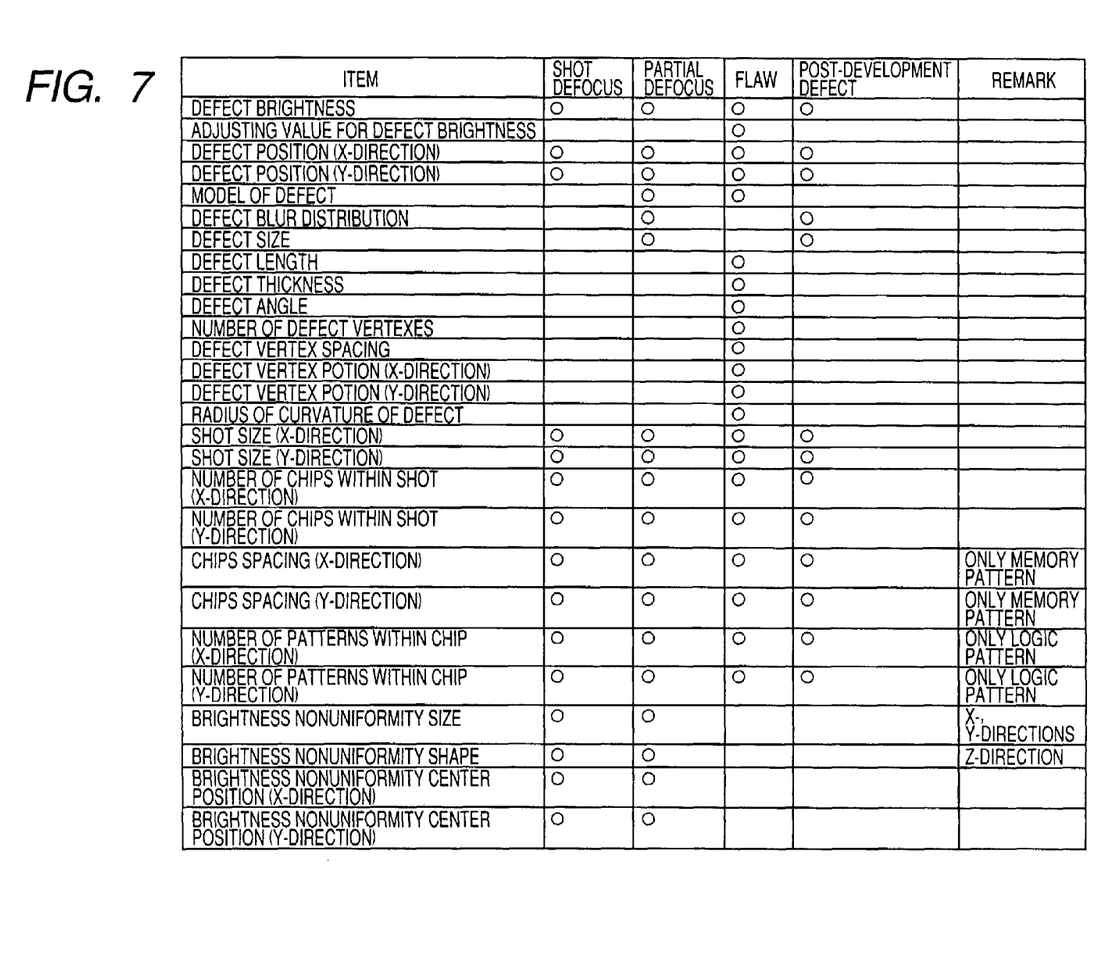
FIG. 7 is a table illustrating the items of an artificial defect image created for each defect type to be classified.

An instruction signal for learning of an artificial defect is entered from the input portion 23. Based on the instruction signal, the image processing portion 20 executes a program for creation of the artificial defects and learning. Images of the artificial defect images are created by the artificial defect image creation portion 22c regarding the defect classifications of a flaw, a post-development defect, a partial defocus, and a shot defocus, in the same way as the above-described defect classifications. Examples of items of artificial defect images created for each corresponding defect type are shown in FIG. 7. The items are determined at random using random numbers. First, an interconnect pattern on a semiconductor wafer (which includes a memory pattern and a logic pattern), brightness, and a shape are determined using random numbers. Further, a defect position on a previously selected good product image using random numbers is determined. The interconnect pattern determined using random numbers includes shot size, number of chips within the shot, and chip spacing, for example. This is used as a background image for the defects. The items of the brightness and shape determined using random numbers differ among types of artificial defects. For example, in the case of a shot defocus, there are defect brightness, defect position, brightness nonuniformity, and so on. In the case of a partial defocus, there are the items of shot defocus. In addition, there are defect model, defect blur distribution, defect size, and so on. In the case of a flaw, there are defect brightness, defect position, defect model, defect length, defect thickness, defect angle, defect vertex, radius of curvature of defect, and so on. In the case of a post development defect, there are defect brightness, defect position, defect blur distribution, defect size, and so on.

Figure 8:
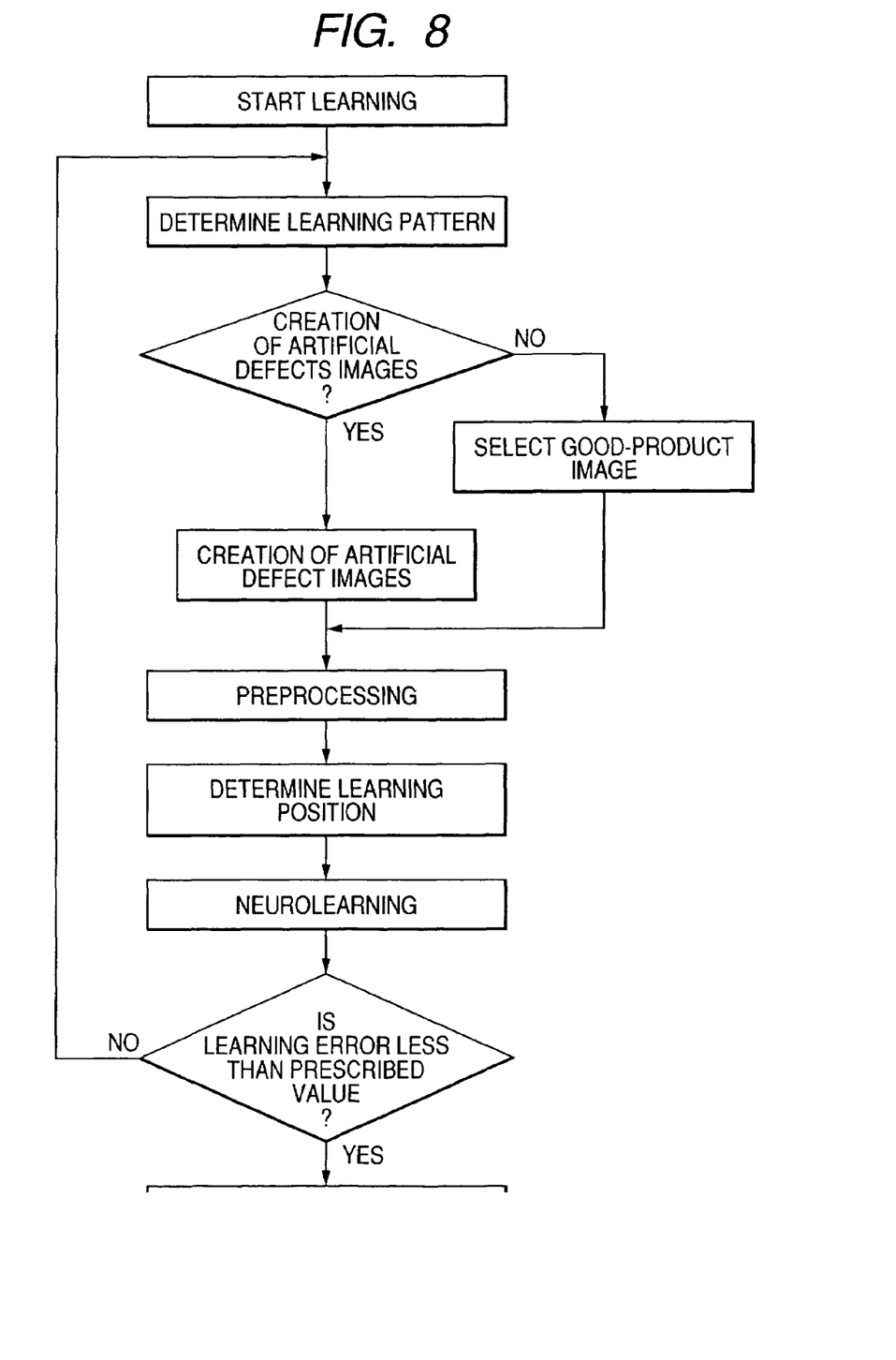
FIG. 8 is a flowchart illustrating the flow of learning using artificial defect images.

FIG. 8 is a diagram illustrating a flow of learning artificial defects. First, it is determined using random numbers as to whether the learning pattern is an image of an artificial defect image or of a good product image. Where the artificial defect image is determined for the learning pattern, an artificial defect image is created for each defect type to be classified as mentioned previously. Where the good product image is determined for the learning pattern, a suppressed pattern is selected. Then, preprocessing (e.g., the artificial defect image and good product image are compressed, expanded, shrunk and passed through a bandpass filter to detect a certain frequency component) is performed in the same way as learning of defect samples. Then, a learning position is determined using random numbers. Learning is carried out based on the corresponding defect types to be classified by the neural networks 22a-22d. The teacher signal is set to 1 in the case of an excitation pattern and to 0 in the case of a suppressed pattern. The learning is repeated. When the learning of the artificial defects ends when the learning error of the output defect decision becomes below a prescribed value. In this way, an artificial defect image is created. The neural network portion 22 is made to learn this. Consequently, a lack of samples of a learning pattern can be compensated for. Further, the generalized capability can be improved.

Then, a defect decision made by the defect detection portion 20b using the neural network portion 22 that has already learned is described. The wafer W placed on the stage 32 is illuminated by diffused illuminating light under control of the control portion 30. An image of the wafer W is taken by the camera 11. The image signal from the camera 11 is entered into the image processing portion 20 and accepted into the image memory 20a, where the image is stored.

The defect decision is made using both the original image obtaining by the imaging and a defect position image. Since it is necessary to make a classification for each defective region, a number is given to each defect in various regions of the defect position image. The image is divided into individual defective regions. Then, the defect decision value of each defective region is found by the neural networks 22a-22d in the following procedure and defects are classified.

(Step 1) A defective region is extracted in the same procedure as the learning and entered into the neural network portion 22 (neural networks 22a-22d) that has learned. The neural network 22d that makes a decision on the shot defocus performs an extraction such that the center of the extraction window becomes the center of the shot.

(Step 2) The output values from the neutral networks 22a-22d are multiplied by a two-dimensional Gaussian window G (dx, dy). The resulting values are additively projected onto the output image to calculate an added projection value P (x,y). The size 1 of the Gaussian window is the same as the input layer size. Also, the added projection value W (x,y) of the Gaussian window itself is calculated.

$$G(d_x, d_y) = \exp\left(-\frac{d_x^2 + d_y^2}{2\sigma^2}\right)$$ Mathematical Formula 1

$$\left(d_x \leq \left|\frac{l}{2}\right|, d_y \leq \left|\frac{l}{2}\right|\right)$$

$$W(x,y) = \Sigma G(dx, dy)$$ Mathematical Formula 2 where dx and dy are the distances from the center of the extraction window, $\sigma^2$ is the dispersion of the two-dimensional Gaussian window, and l is the size of the Gaussian window.

Figure 5:
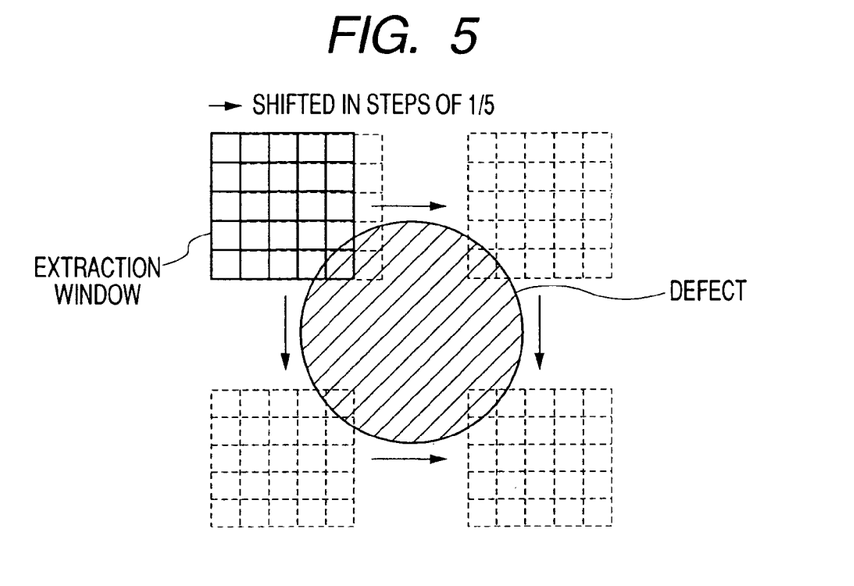
FIG. 5 is a diagram illustrating scanning of an extraction window.

(step 3) As shown in FIG. 5, the extraction window is scanned in the x- and y-directions in the following steps. The amount of the steps is set equal to the size of one shot in the case of a shot defocus and set to one-fifth of the size of the extraction window in other cases.

(Step 4) The steps 1-3 are repeated to search one defective region fully.

(Step 5) The decision value O (x, y) of each defect taking account of weighting owing to the two-dimensional Gaussian window is calculated for each of all the pixels in the defective region.

$$O(x, y) = \frac{P(x, y)}{W(x, y)}$$ Mathematical Formula 3

(Step 6) The average defect decision value $J_n$ over the defective region is calculated.

$$J_n = \frac{1}{S}\sum O(x, y)$$ Mathematical Formula 4 where S is the area of a defective region n.

(step 7) The average decision values $J_n$ of defects of the neural networks 22a-22d are compared, and a defect providing a maximum decision value is found. Then, the decision value of the defect is compared with a threshold value 0.4 that has been previously determined by a preliminary experiment. If the value is higher than the threshold value, it is judged that the candidate defect is exactly the defect. If the value is less than the threshold value, it is judged that the candidate defect is other defect. The threshold value 0.4 has been experimentally found.

In the embodiment described so far, the object to be inspected is a semiconductor wafer. The present invention can be preferably applied to a liquid crystal substrate and so on.

What is claimed is:

1. A defect inspection apparatus for inspecting an object to be inspected for a defect by processing an image taken from the object, the defect inspection apparatus comprising:
   neural networks provided respectively for individual defect types to be classified;
   a learning unit which makes the neural networks learn based on the corresponding defect types to be classified; and
   a defect detection unit which classifies and detects defect types using the neural networks that have learned,
   wherein the neural networks include at least two of a neural network for a flaw produced during fabrication of the object, a neural network for a partial defocus produced during exposure of the object, a neural network for a shot defocus produced during exposure of the object, and a neural network for a post-development defect produced during development of the object.

2. A defect inspection apparatus for inspecting an object to be inspected for a defect by processing an image taken from the object, the defect inspection apparatus comprising:
   neural networks provided respectively for individual defect types to be classified, wherein the neural networks include a neural network for a shot defocus produced during exposure of the object;
   a learning unit which makes the neural networks learn based on the corresponding defect types to be classified;
   a defect detection unit which classifies and detects defect types using the neural networks that have learned; and
   an image size conversion unit which converts size of the taken image by an affine transformation so as to correspond to size of an input layer before the taken image is entered into the neural network for a shot defocus.

3. A defect inspection apparatus for inspecting an object to be inspected for a defect by processing an image taken from the object, the defect inspection apparatus comprising:
   neural networks provided respectively for individual defect types to be classified;
   a learning unit which makes the neural networks learn based on the corresponding defect types to be classified;
   a defect detection unit which classifies and detects defect types using the neural networks that have learned; and
   an interpolation unit which, where the taken image contains outside of an objective region of the object, interpolates data about the outside of the objective region based on data about brightness of the objective region before the taken image is entered into the neural networks.

4. A defect inspection apparatus for inspecting an object to be inspected for a defect by processing an image taken from the object, the defect inspection apparatus comprising:
   a neural network; an artificial defect image creation unit which creates an artificial defect, image by image processing;
   a learning unit which makes the neural network learn by the created artificial defect image; and
   a defect detection unit which detects the defect using the neural network that have learned,
   wherein the artificial defect image creation unit creates the artificial defect image by determining at least one of a position, brightness, and a shape of the detect using random numbers.

* * * * *